(12) United States Patent
Gero et al.

(10) Patent No.: US 10,212,203 B2
(45) Date of Patent: *Feb. 19, 2019

(54) STREAM-BASED DATA DEDUPLICATION WITH CACHE SYNCHRONIZATION

(71) Applicant: Akamai Technologies, Inc., Cambridge, MA (US)

(72) Inventors: Charles E. Gero, Quincy, MA (US); Andrew F. Champagne, Ware, MA (US); F. Thomson Leighton, Newtonville, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,660

(22) Filed: Sep. 19, 2016

(65) Prior Publication Data

US 2017/0006077 A1 Jan. 5, 2017

Related U.S. Application Data

(63) Continuation of application No. 14/140,102, filed on Dec. 24, 2013, now Pat. No. 9,451,000.

(60) Provisional application No. 61/746,297, filed on Dec. 27, 2012.

(51) Int. Cl.
*G06F 15/167* (2006.01)
*H04L 29/06* (2006.01)
*H04L 29/08* (2006.01)

(52) U.S. Cl.
CPC .............. *H04L 65/60* (2013.01); *H04L 67/06* (2013.01); *H04L 67/2847* (2013.01)

(58) Field of Classification Search
CPC ....... H04L 67/06; H04L 67/42; H04L 67/108; H04L 67/2847; H04L 65/60
USPC ........................................ 709/213, 217, 219
See application file for complete search history.

*Primary Examiner* — Joseph E Avellino
*Assistant Examiner* — Marshall M McLeod
(74) *Attorney, Agent, or Firm* — David H. Judson

(57) ABSTRACT

Stream-based data deduplication is provided in a multi-tenant shared infrastructure but without requiring "paired" endpoints having synchronized data dictionaries. Data objects processed by the dedupe functionality are treated as objects that can be fetched as needed. As such, a decoding peer does not need to maintain a symmetric library for the origin. Rather, if the peer does not have the chunks in cache that it needs, it follows a conventional content delivery network procedure to retrieve them. In this way, if dictionaries between pairs of sending and receiving peers are out-of-sync, relevant sections are then re-synchronized on-demand. The approach does not require that libraries maintained at a particular pair of sender and receiving peers are the same. Rather, the technique enables a peer, in effect, to "backfill" its dictionary on-the-fly. On-the-wire compression techniques are provided to reduce the amount of data transmitted between the peers.

15 Claims, 4 Drawing Sheets

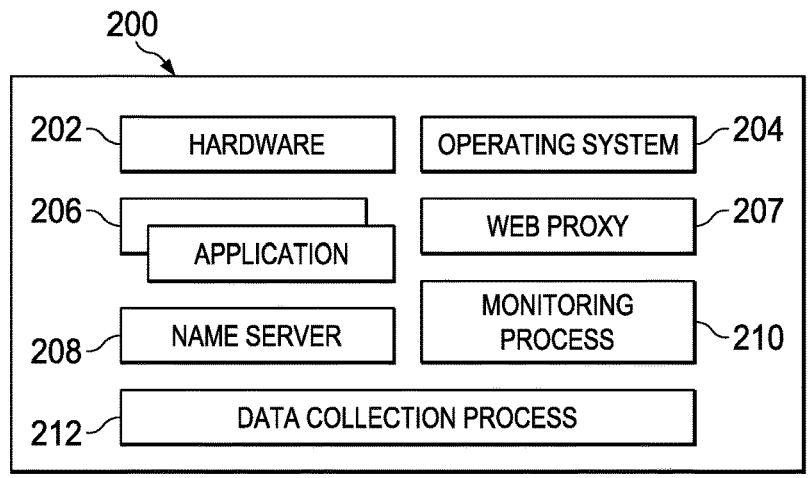
FIG. 2
| Fingerprint | Data |
|---|---|
| X | [llo, how a] |
| M | [mai is Awes] |
| W | [elepho] |
| T | [Aka] |
| O | [ome!] |
| ⋮ | ⋮ |
| J | [ppenheimer] |
FIG. 3
| Fingerprint | Data |
|---|---|
| R | [nny Cash in Fol] |
| M | [mai is Awes] |
| W | [elepho] |
| X | [llo, how a] |
| T | [Aka] |
| ⋮ | ⋮ |
| K | [anhatta] |
FIG. 4
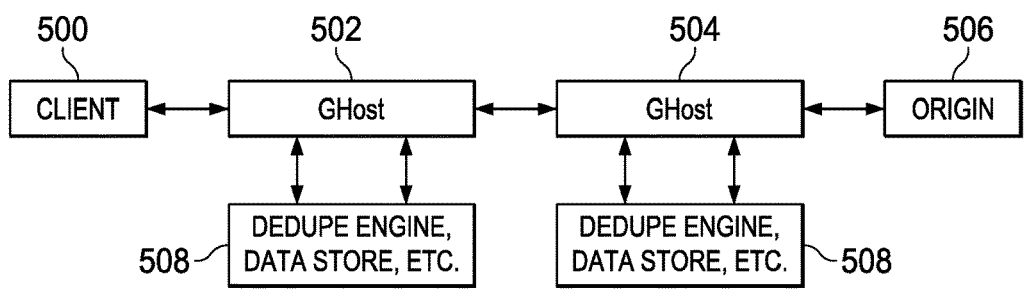
FIG. 5

STREAM-BASED DATA DEDUPLICATION WITH CACHE SYNCHRONIZATION

BACKGROUND

Technical Field

This application relates generally to data communication over a network.

Brief Description of the Related Art

Distributed computer systems are well-known in the prior art. One such distributed computer system is a "content delivery network" or "CDN" that typically is operated and managed by a service provider. The service provider typically provides the content delivery service on behalf of third parties (customers) who use the service provider's shared infrastructure. A distributed system of this type is sometimes referred to as an "overlay network" and typically refers to a collection of autonomous computers linked by a network or networks, together with the software, systems, protocols and techniques designed to facilitate various services, such as content delivery, application acceleration, or other support of outsourced origin site infrastructure. A CDN service provider typically provides service delivery through digital properties (such as a website), which are provisioned in a customer portal and then deployed to the network.

Data differencing is a known technology and method to leverage shared prior instances of a resource, also known as versions of data within a shared dictionary in compression terminology, between a server and a client; the process works by only sending the differences or changes that have occurred since those prior instance(s). Data differencing is related to compression, but it is a slightly distinct concept. In particular, intuitively, a difference ("diff") is a form of compression. As long as the receiver has the same original file as a sender, that sender can give the receiver a diff instead of the entire new file. The diff in effect explains how to create the new file from the old. It is usually much smaller than the whole new file and thus is a form of compression. The diff between a first version of a document and a second version of that same document is the data difference; the data difference is the result of compression of the second version of a document using the first version of the document as a preset dictionary.

Stream-based data deduplication ("dedupe") systems are also known in the prior art. In general, stream-based data deduplication systems work by examining the data that flows through a sending peer of a connection and replacing blocks of that data with references that point into a shared dictionary that each peer has synchronized around the given blocks. The reference itself is much smaller than the data and often is a hash or fingerprint of it. When a receiving peer receives the modified stream, it replaces the reference with the original data to make the stream whole again. For example, consider a system where the fingerprint is a unique hash that is represented with a single letter variable. The sending peer's dictionary then might look as shown in FIG. 3. The receiving peer's dictionary might look as shown in FIG. 4. Then, for example, if the sending peer is supposed to send a string such as "Hello, how are you? Akamai is Awesome!" the deduplication system would instead process the data and send the following message: "He[X]re you? [T][M] ome!" The receiving peer decodes the message using its dictionary. Note that, in this example, the sending peer does not replace "ome!" with the reference [0]. This is because, although the sending peer has a fingerprint and block stored it its cache, that peer knows (through a mechanism) that the receiving peer does not. Therefore, the sending peer does not insert the reference in the message before sending it. A system of this type typically populates the dictionaries, which are symmetric, in one of several, known manners. In one approach, dictionary data is populated in fixed length blocks (e.g., every block is 15 characters in length) as a stream of data flows through the data processor. The first time the data passes through both the sending and receiving peers, and assuming they both construct dictionaries in the same way, both peers end up having a dictionary that contains the same entries. This approach, however, is non-optimal, as it is subject to a problem known as the "shift" problem, which can adversely affect the generated fingerprints and undermining the entire scheme.

An alternative approach uses variable-length blocks using hashes computed in a rolling manner. In a well-known solution based on a technique known as Rabin fingerprinting, the system slides a window of a certain size (e.g., 48 bytes) across a stream of data during the fingerprinting process. An implementation of the technique is described in a paper titled "A Low-Bandwidth Network File System" (LBFS), by Muthitacharoen et al, and the result achieves variable size shift-resistant blocks.

Current vendors supplying stream-based data deduplication products and services address the problem of dictionary discovery (knowing what information is in a peer's dictionary) by pairing devices. Thus, for example, appliance/box vendors rely on a pair of devices or processes on each end to communicate with each other to maintain tables that let each side know what references exist in the paired peer. This type of solution, however, only works when dealing with individual boxes and units that represent "in path" pairs.

In path-paired solutions, however, are not practical in the context of an overlay network such as a CDN, where the distribution of nodes more closely resembles a tree. Thus, for example, in a representative implementation, and with respect to a particular origin server (or, more generally, a "tenant" located at a "root"), the overlay may have parent tier servers closer to the root, and client edge servers closer to the leaf nodes. In other words, instead of a box needing to be aware of a small set of one or more peer boxes (such as in known box vendor solutions), a parent tier server may need to be in contact with tens, hundreds or even thousands of edge regions, each containing potentially many servers. In this context, per machine tables cannot scale.

Thus, there remains a need to provide enhanced techniques for data deduplication in the context of an overlay network.

BRIEF SUMMARY

An Internet infrastructure delivery platform (e.g., operated by a service provider) provides an overlay network (a "multi-tenant shared infrastructure"). A particular tenant has an associated origin. One or more overlay network servers that are near a tenant origin are equipped with a dedupe engine that provides data deduplication. These servers are dedupe cache parents for that origin in that they receive requests from overlay network cache childs, typically edge servers that are located near to end user access networks. An edge server also includes a dedupe engine. When a request for origin content arrives from an overlay network edge server, the request is routed through a dedupe cache parent for the origin. The cache parent retrieves the content (perhaps from the origin) and then performs a traditional dedupe operation. In particular, the cache parent first looks into its "library" (or "dictionary") for the origin and sees if it can compress the object by replacing chunks of bytes that it has already seen with the names that have already been assigned for those chunks. This operation "compresses" the object in a known manner. The cache parent then sends the compressed object to the overlay network edge server, where it is processed by the edge server dedupe engine. Outside of this delivery loop, however, the dedupe cache parent also processes the object to store newly-seen chunks of bytes, and entering the new chunks into the library (or "dictionary") that it maintains. When the compressed stream is received at the overlay network edge server, the edge server processes the compressed stream by looking for chunks that were replaced by names (or "fingerprints"), and then retrieving the original chunks using the fingerprints as keys into its own dictionary.

If the edge server does not have the chunks in cache that it needs, it follows a conventional CDN approach to retrieve them (e.g., through a cache hierarchy or the like), ultimately retrieving them from the dedupe cache parent if necessary. Thus, if dictionaries between pairs of sending and receiving peers are out-of-sync, relevant sections are then re-synchronized on-demand. The approach does not require (or require a guarantee) that libraries maintained at a particular pair of sender and receiving peers are the same (i.e., synchronized). Rather, the technique enables a peer, in effect, to "backfill" its dictionary on-the-fly in association with an actual transaction. This approach is highly scalable, and it works for any type of content, and over any type of network.

Additional on-the-wire compression between a pair of deduplication engines is provided by maintaining a unique form of data structure on each side of the connection. Preferably, the data structure is a "directed cyclic graph" (DCG), wherein a given DCG represents temporal and ordered relationships between (and among) chunks of data that have been seen in a data stream by the peer. In particular, a DCG comprises one or more nodes, each of which represent a chunk of data, a label that represents or is the fingerprint, and an edge (e.g., an arrow) that represents a transition that the peer has seen in the data stream with respect to that chunk. A node has a set of allowed state transitions. For example, a node that has one just one (1) "out" (an arrow that leads away from the node) is an Intermediate Node, and a stretch of nodes each with degree 1 "out" and that are connected together are referred to as a Strand. A Strand Record defines the particular nodes (and their fingerprints) that comprise a Strand. When the content that traverses the peers has large strings of data (e.g., in file headers) that does not change, it is likely that there will be a large number of nodes in the resulting DCGs that include Strands. Thus, the transmission of Strand Records between cooperating dedupe engines can significantly reduce the amount of information transmitted on the wire during the deduplication process. In particular, once the DCG is in place on both peers, an encoding scheme is then carried out using the Strand Records where appropriate (i.e., where the DCG includes Strands) such that the amount of data that is placed on the wire is substantially reduced (by sending the Strand Record in lieu of the actual node and fingerprint data making up the Strand). Then, when there is a mismatch between the caches, a decoding peer can make a request (a Missing Strand Request) back up to an encoding peer and request the raw data represented by the noted strand.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 2 is a representative CDN edge machine configuration;

FIG. 3 is a sending peer dictionary in a data differencing process;

FIG. 4 is a receiving peer dictionary in a data differencing process;

FIG. 5 is an exemplary wide area network (WAN) architecture for implementing an asynchronous data dictionary approach;

DETAILED DESCRIPTION

Figure 1:
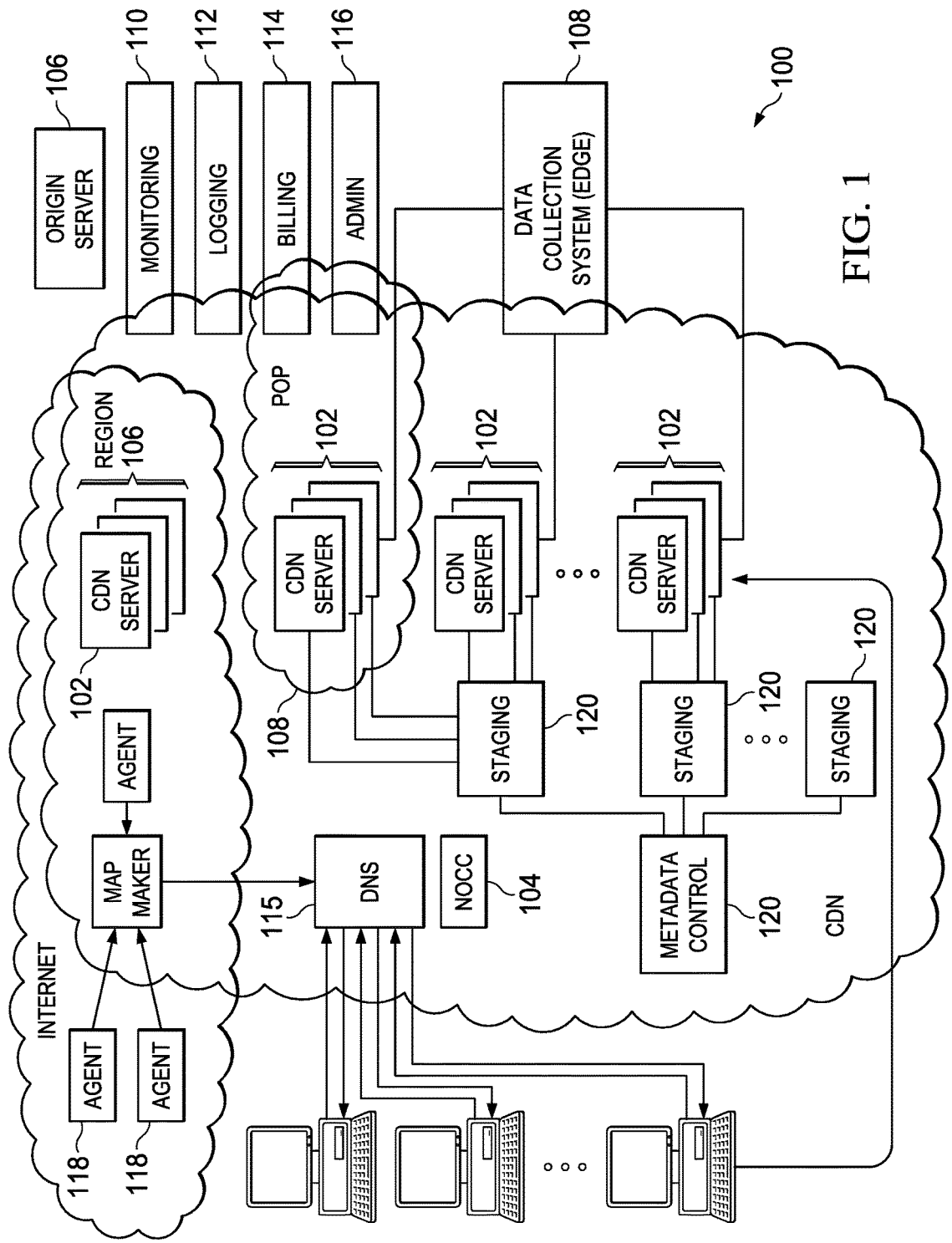
FIG. 1 is a block diagram illustrating a known distributed computer system configured as a content delivery network (CDN)

FIG. 1 illustrates a known distributed computer system that (as described below) is extended by the techniques herein.

In a known system, such as shown in FIG. 1, a distributed computer system 100 is configured as a CDN and is assumed to have a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP (web) proxy 207, a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

Because the CDN infrastructure is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

An overlay network web proxy (such as proxy 207 in FIG. 2) that is metadata-configurable is sometimes referred to herein as a global host or GHost process.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

As additional background, the techniques described in U.S. Pat. Nos. 6,820,133 and 7,660,296 may be used to facilitate packet delivery between edge and forward proxies in an overlay network such as shown in FIG. 1.

Stream-Based Data Deduplication Using Asynchronous Data Dictionaries

With the above as background, the approach of this disclosure is now described. In contrast to known stream-based data deduplication products and services that address the problem of dictionary discovery (knowing what information in in a peer's dictionary) by pairing, the techniques herein operates according to a different paradigm.

In particular, and for certain sized objects, a peer node is "assumed" to have a block associated with a fingerprint, whether or not it actually does. In this approach, the technique does not require (or require a guarantee) that libraries maintained at either end (of any particular pair of sender and receiving peers) are the same. Rather, in this approach, a library is created, and that library is the allowed to be accessible (e.g., over the web). The library can be located anywhere. As will be seen, this approach enables the standard CDN functions and features to be leveraged, thus providing end users (including those on both fixed line and non-fixed-line networks, and irrespective of application type) both the benefits of deduplication as well as those afforded by overlay networking technologies. In this alternative approach, if the peer does not have the block associated with a given fingerprint, the peer makes a request back to the sending agent to request it. In one embodiment, each block has a particular URI associated therewith, such as a magnet-style URI. A magnet URI refers to a resource available for download via a description of its content in a reduced form (e.g., a cryptographic hash value of the content). An alternative to using a magnet URI is to have a decoding (receiving or child) peer make a request back up to the encoding (sending or parent) peer (or peer region) and request the raw data for whatever chunk is not then available to the decoding peer for decode—using some agreed-upon protocol. Preferably, the processing of data on the decoder side is very fast, and thus a missing chunk is detected and a request sent back to the encoder within some small processing overhead time.

Preferably, special care is taken to avoid extraneous round trips back to the sending peer for blocks that are missing. Therefore, in one embodiment, files that are very small and capable of being sent in one initial congestion window (CWND) are not deduplicated, as the risk of a block cache miss is greater than the payout when the block exists at the receiving peer. This is because the serialization delay into a network I/O card is significantly smaller than the latency that might occur on a cache miss. Thus, preferably only those responses where there is a statistical probability of any advantage using deduplication (even in the face of possible extra latency due to missing blocks) should be considered.

Thus, according to this disclosure, the deduplication system uses an on-demand cache synchronization protocol, which may involve peers communicating with each other explicitly, and that involves a peer making certain assumptions about what another peer might have, or otherwise. According to this protocol, there is an assumption that the decoding peer has a given block of data if the local encoding peer already has it, and an assumption that the decoding peer entity does not have the given block of data if the local encoding peer does not. Further, the system accounts for a mismatch in caches between peers. If this occurs, the mismatch is resolved. To this end, whenever some data (an object, a chunk, a set of chunks, etc. that have been seen in a stream) is not available for decode, the decoding peer makes a request back up to the encoding peer (or region of peers) and requests the raw data needed. As noted above, the processing of data on the decoder side is very fast and thus the missing data is detected and a request sent back to the encoder within only a small processing overhead time. This approach ensures that, irrespective of what cache synchronization protocol is being utilized, there is a fallback mechanism to ensure that a transaction can complete. The missing data support thus handles the possibility of complete cache misses, and it can be used in conjunction with the cache synchronization approach described above.

A representative architecture for implementing a deduplication approach of this type is shown in FIG. 5. For simplicity, a client 500 is shown interacting with an edge GHost process 502, which in turn communicates (typically over a WAN) with a forward GHost process 504 located near a tenant origin 506. Each GHost process 502 and 504 has associated therewith a deduplication engine 508, an associated data store for the dictionary, and other related processes. Collectively, these elements are sometimes referred to as a dedupe module. The cache parent may also implement other technologies, such as front end optimization (FEO). GHost communicates with the deduplication module over some interface. In an alternative embodiment, the deduplication functionality is implemented in GHost natively. When a request for origin content arrives from process 502, the request is routed through the cache parent 504 for the origin. The cache parent 504 retrieves the content (perhaps from the origin) and then performs a traditional dedupe operation, using its dedupe engine 508. In particular, the cache parent first looks into its library and sees if it can compress the object by replacing chunks of bytes that it has already seen with the names that have already been assigned for those chunks. Preferably, a library is shared among multiple CDN customers; in an alternative embodiment, a library is specific to a particular origin. The cache parent 504 then sends the compressed object to edge server process 502, where it is processed by the edge server dedupe engine 508. Outside of this delivery loop, however, the dedupe cache parent 504 also processes the object to store newly-seen chunks of bytes, entering the new chunks into its library. When the compressed stream is received at the edge server process 502, the edge server processes the compressed object by looking for chunks that were replaced by names (or "fingerprints"), and then retrieving the original chunks using the name.

Figure 6:
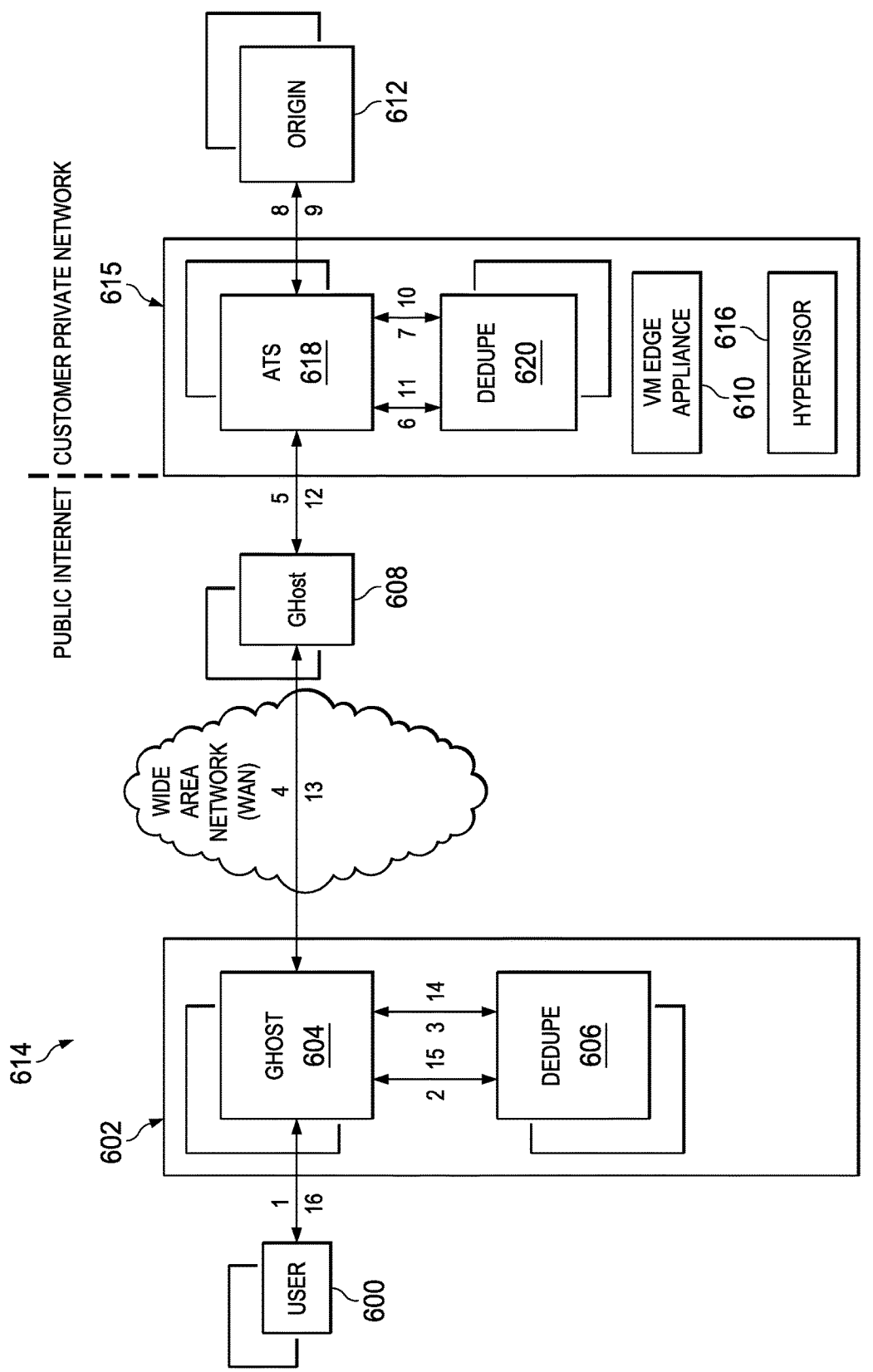
FIG. 6 is a specific embodiment of the technique shown in FIG. 5 implemented within an overlay network and a customer private network.

A more specific embodiment is shown in FIG. 6. In this scenario, an end user 600 has been associated with an edge server machine 602 via overlay network DNS in the usual manner. An "end user" is a web browser user agent executing on a client machine (e.g., desktop, laptop, mobile device, tablet computer, or the like) or mobile application (app) executing on such a device. An "end user" communicates with the edge server machine via HTTP or HTTPS, and such communications may traverse other networks, systems, and devices. Edge server machine executes a metadata-configurable web proxy process (GHost) 604 managed by the overlay network provider, and an associated stream-based data deduplication process 606. As will be described, the dedupe process theoretically performs data compression on all blocks from all files from all CDN customers. In this approach, pieces of a file from a different URI may be used to perform deduplication, as well as pieces from multiple files at the same time. The edge server machine 602 may be a "child" to one or more "parent" nodes, such as a parent GHost process 608 executing on another overlay server appliance (not shown). In this example, GHost process 608 is a "pass-through" and does not provide differencing functionality; it may be omitted.

As also seen in FIG. 6, requests from the client side are directed to an "origin" server 612. The origin (or target) server 612 is a server that typically executes in an overlay network customer infrastructure (or perhaps some other hosted environment, such as a third party cloud-based infrastructure). Typically, origin server 612 provides a web-based front-end to a web site or web-accessible customer application that is desired to be accelerated using the overlay network infrastructure. In this example scenario, which is not intended to be limiting, the origin server 612 executes in the customer's own private network 614. Customer private network 614 includes a physical machine 615. That machine (or some other machine in the customer network) may support another web proxy process 618, and an associated dedupe process 620. Web proxy 618 need not be metadata-configurable, nor does it need to be managed actively by the overlay network. The architecture shown above is not intended to be limiting, but rather is provided as just an example.

The following is a description of an end-to-end flow. In this scenario, and as noted above, "GHost" refers to a metadata-configurable web proxy process executing on an edge appliance in an overlay network, "ATS" refers to an overlay network web proxy process executing on an appliance within a customer network or infrastructure but distinct from the overlay network, and the de-dupe process can perform de-duplication with respect to all blocks from all files local to the specific customer's network (in this example embodiment). As noted above, and depending on the network architecture employed, a library may also be shared so that the associated de-dupe process can perform de-duplication with respect to all blocks from all (or some number of the) overlay network customers. In the illustrated embodiment, a GHost (or ATS) process as the case may be communicates with an associated dedupe process via an interface (e.g., localhost).

In a representative (but non-limiting) implementation as shown in FIG. 6, the overlay network provider provides software that runs within a customer's infrastructure (the private network), e.g., as a virtual machine (VM) or "edge appliance." The edge appliance 610 preferably is located either in the DMZ or behind an enterprise firewall and it may execute on a hypervisor (e.g., VMware ESXi (v. 4.0+)) 616 supported and managed by the overlay network customer. In one preferred embodiment, the edge appliance is distributed as a 64-bit virtual appliance downloaded via an overlay network customer portal (extranet). Each edge appliance requires at least one publically routable IP address and may be configured by the overlay network, preferably over a secure connection.

Thus, according to the above approach, at least one server associated with a tenant origin is equipped (or associated) with a dedupe engine. When a request comes for content from an edge server, the request is routed through a dedupe cache parent for the origin. The cache parent retrieves the content (perhaps from origin) and then, depending on the content size and any applicable configuration parameters, performs deduplication. If deduplication occurs, the parent cache examines its dictionary; if it can compress the object (by replacing chunks of bytes that it has already seen with the names that have already been assigned for those chunks), it does so. The cache parent then sends the compressed object to the edge server. Separately, the dedupe cache parent processes the object to store newly-seen chunks of bytes, entering them into the library that it maintains. When the compressed object is received at the edge server, as described above, the edge server processes the compressed object by looking for chunks that were replaced by names and then retrieving the original chunks using the names, as has been described.

Generalizing, according to this disclosure, as a stream goes through/traverses a parent node, the parent node breaks the stream into chunks. For every chunk, the parent then makes what is, in effect, a "guess" regarding whether the child node to which the stream is being sent has that chunk. The "guess" may be informed in any way, e.g., it may be statistical, probabilistic, based on some heuristic, be derived based on executing an algorithm, be based on the relative location of the child, be based on load, latency, packet loss, or other data, or be determined in some other manner. If the parent's belief is that the child does not have the chunk already, it sends the actual data. If, however, the parent's belief is that the child likely has the chunk, then the parent just sends the name/fingerprint. As the child gets the encoded stream and begins to decode the stream, for every chunk reference/name, the child then looks up the name in its own local library/dictionary. If the chunk is there, the child re-expands it. If, however, the chunk is not present, the child performs an on-demand request (e.g., to the encoding peer/region) requesting the actual data for the chunk.

With this approach, all the known benefits of a CDN (e.g., load balancing, caching, WAN acceleration, and so forth) are leveraged. Importantly, the edge server does not need to maintain a symmetric library for the origin. Of course, the edge server might well have the chunks in cache but, if it does not, it follows the usual CDN-like procedure to retrieve them (e.g., through a cache hierarchy or the like), ultimately retrieving them from the dedupe cache parent if necessary.

The GHost process has the capability of determining whether a request is to be handled by the deduplication process. One technique for making this determination uses tenant-specific metadata and the technique described in U.S. Pat. No. 7,240,100.

The dedupe module may run as a buddy process or an in-process library with respect to GHost. The communication mechanism between GHost and the module may be over shared memory, localhost, TCP, UDS, or the like. In an alternative embodiment, the client-side dedupe module itself may be placed directly on a client device, such as an end user client (EUC) network machine, a mobile device handset, or the like.

Preferably, whether dedupe is turned on may be controlled by metadata configurations, preferably on a per-tenant basis.

As noted above, preferably the dedupe mechanism is not invoked for files that are too small. Small object aversion support thus provides a way to intelligently avoid performing otherwise risky deduplication operations that might incur an extra RTT on a cache miss. In one approach, this may be accomplished by having GHost bypass the dedupe operation for POSTs and responses that include a "Content-Length" header under a certain threshold. Most dynamic content, however, uses chunked transfer encoding, which means that the size of the object is not known in advance. Thus, absent some determination to avoid deduplication based on other criteria, GHost should pass the request through the mechanism described.

In addition, preferably the fingerprint is only sent when there is good assurance that the other side may have the data. Thus, preferably the fingerprint is only sent if the block was seen in the same or a prior stream.

Some file formats (like Huffman encoding) are heavily compressed as well as jumbled. Commercial deduplication systems often offer systems within their deduplication engines to decode those file types into more deduplication-friendly formats prior to performing fingerprinting and chunking. Such approaches may be implemented herein as well. In particular, each side (whether in GHost or in the dedupe module itself) may implement per file format decompression filters to better ensure cached block hits.

The GHost/dedupe module solution described herein may also interoperate with protocol terminators. Protocol terminators are pieces of software that terminate a protocol (such as CIFS or MAPI) and convert it, e.g., to http or http(s).

The dedupe module may interoperate with other CDN mechanisms, such as FEO techniques.

As shown in FIG. 6, 1 dedupe module as described herein may be located within an enterprise network, such as in a machine associated with the overlay network that is located in an enterprise DMZ.

As also shown in FIG. 6, a dedupe module as described herein may be located within a virtual machine (VM) associated with an enterprise that uses or interoperates with the overlay network. This architecture is not a limitation, however, as the forward proxy need not be positioned within an enterprise (or other customer private network).

The dedupe techniques described herein may be used in association with one or more other CDN service offerings, to facilitate CDN node-to-node communications (in-network deduplication), or the like.

The GHost and dedupe modules are implemented in software, executed in one or more processors, as a specialized machine.

There is no limitation on the type of data that may be processed by the described technique. Indeed, for certain data types (such as PII), data deduplication such as described herein has significant advantages over caching alone.

The dedupe function may be implemented in a daemon process, namely, as a set of computer program instructions executed by a hardware processor. The daemon may function as both the client and the server in the HTTP-based protocol described above. Preferably, it is shunted into or onto the servers (e.g., GHost) at the ends of a high latency leg of communication within an overlay network. As described above, preferably metadata configuration data determines whether a particular request (on the sending side of the connection) should be considered a request that should be accelerated using the protocol.

In general, the approach described herein enables the overlay servers to remove redundant data it is sending between peers on the network, instead sending much smaller fingerprints. This reduces the overall size of the data on the wire drastically for transactions that have high amounts of duplicate data, thus reducing the amount of time for delivery to the end user. In addition, the reduced data results in lowered operating costs on the network as the amount of information transferred and the bandwidth requires decreases.

The above-described approach is highly scalable, and it works for any type of content, and over any type of network. The client is a conventional desktop, laptop or other Internet-accessible machine running a web browser or other rendering engine (such as a mobile app). The client may also be a mobile device. As used herein, a mobile device is any wireless client device, e.g., a cellphone, pager, a personal digital assistant (PDA, e.g., with GPRS NIC), a mobile computer with a smartphone client, or the like. Other mobile devices in which the technique may be practiced include any access protocol-enabled device (e.g., iOS™-based device, an Android™-based device, or the like) that is capable of sending and receiving data in a wireless manner using a wireless protocol. Typical wireless protocols are: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. In a representative embodiment, the mobile device is a cellular telephone that operates over GPRS (General Packet Radio Service), which is a data technology for GSM networks. A mobile device as used herein may be a 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards.

Directed Cyclic Graphs

Fingerprinting (using SHA-1 for example) provides hashes that are 20 bytes in length, and, in one implementation of the above-described technique, typically replaces blocks in the data stream that have an average size of 128 bytes, thus creating a maximum theoretical compression limit of 20/128=15%. To increase that percentage, an additional compression mechanism preferably is used. This mechanism provides wire compression, and it is referred to as the Directed Cyclic Graph method (DCG). It is now described.

Figure 7:
FIG. 7 illustrates a representative directed cyclic graph (DCG) of a set of chunks of data that have been seen by a peer in the deduplication scheme described.

As used herein, a directed cyclic graph (DCG) represents temporal and ordered relationships between (and among) chunks of data that have been seen in streams passing between peers (that execute dedupe engines in the manner described above). Each node (e.g., a circle) in a DCG represents a chunk of data. Its label preferably denotes a fingerprint (in practice fingerprints are much larger, but this shorter notation is for descriptive purposes). Each edge (e.g., an arrow) in a DCG represents a transition that the machine has seen. Now, assume that the first time a deduplication system such as described above in FIG. 6 loads and sees a stream of data; the resultant fingerprints are: [A][B][C][D][E][F][G]. This nomenclature means that the machine has seen chunk [A] followed by [B] followed by [C], and so on for chunks [D][E][F][G]. An initial directed cyclic graph of these fingerprints would then appear as shown in FIG. 7.

By convention, nodes A through F are Intermediate Nodes. An Intermediate Node then is any node with degree "out" (outward) of exactly one (1). Node G is a Terminal Node. A Terminal Node is a node that has degree out of exactly zero.

Figure 8:
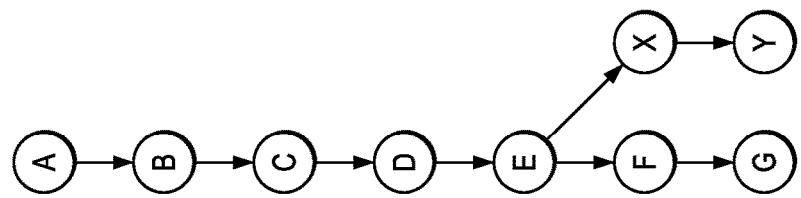
FIG. 8 illustrates a modification of the DCG in FIG. 7 following receipt of another stream of data at the peer.

Now, assume another stream of data comes in to the peer node and that is processed with the following fingerprints: [B][C][D][E][X][Y]. This operation would internally modify the DCG of FIG. 7 to look like FIG. 8. In this example, a new type of node has been introduced and is referred to as an Overflow Node. An Overflow Node is a node with degree out greater than one. In FIG. 8, this is node E.

According to the DCG scheme of this disclosure, a node in a DCG has a set of state transitions. Preferably, the allowed state transitions for a node in the compression DCG scheme are then as follows. Nodes begin life in a Terminal Node state, and nothing follows them. Once another node follows the node in question, its state transitions to Intermediate, and it may never go back to the Terminal state again (as its degree out has forever been changed). If any other nodes (other than the one already mentioned) ever immediately follow the node in question, its state transitions to Overflow, and again the state may not transition back to Intermediate or Terminal (as its degree out has been forever altered).

Once the directed cycle graph is in place on both peers, a variant of run length encoding is then carried out, as will now be described. Assume another stream of data is seen that looks like the following: [A][B][C][D][E][X]. When sending the fingerprints to the decoding peer, the encoder may then state as follows: start at node A (FIG. 8) and "go down four steps." (There is no ambiguity in this if the DCGs on each peer are in sync). Because each node has degree out of exactly one, it is clear what nodes to which this instruction refers. Then, at node E, a decision must be made because this is an Overflow Node. In other words, the encoder must direct the decoding peer which branch to traverse. It does this by simply sending a new record for X.

According to this scheme, these stretches of nodes with degree out of one that are connected together are called Strands. When communicating with a peer, the sending peer sends a Strand Record that represents the wire data. It is possible that a DCG on one peer could fall out of sync with the graph on another peer. In that case, it is possible that the encoding peer would instruct the decoding peer to start at a particular node and go down a certain number of steps, and that the decoding peer is capable of doing this but the data is different. According to an aspect of the DCG scheme, this is guarded against by providing a hash of the fingerprints that are to be traversed. Therefore, a Strand Record preferably is composed of the following tuple:

[Starting Fingerprint] [Number of Nodes] [Hash of Nodes Below Starting Fingerprint] If the decoding peer cannot verify the Strand Record's signature, then preferably the decoding peer sends a Missing Strand Request to the encoding peer, as described in more detail below.

Figure 9:
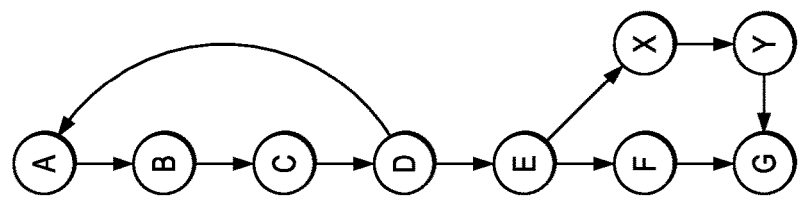
FIG. 9 illustrates a modification of the DCG in FIG. 8 to illustrate how a portion of the stream may loop back on itself.

Returning back to the DCG terminology, the purpose of the "cyclic" part of the graph can be seen by way of an example. Often, there may be circumstances where a strand loops back in on itself. For example, using the above examples, a peer might see a stream that looks like the following: [A][B][C][D][A][B][C][D][A][B][C][D][A][B][C][D][E][X][Y][G]. This would generate a DCG such as shown in FIG. 9. Then, if at a later time if the following data stream were sent: [A][B][C][D]×100[E][X][Y][G], the following would be output: [A:3:HASH(B·C·D)][A:3:H (B·C·D)] . . . [E:3:HASH(X·Y·G)], where the [A:3:HASH (B·C·D)] sequence appears 100 times. To avoid this repetition problem, and according to this disclosure, the output of the DCG may be passed through a deflation algorithm. An algorithm that uses Lempel-Ziv-77 (or equivalent) to remove repetition in the stream may be used for this purpose. In addition, a coding, such as Huffman Coding, may also be used to minimize the size of the output tokens. This approach can compress the 100 A Strand Records (in this example scenario) into a single token sequence.

The DCG approach as described above facilitates significant on-the-wire compression. Indeed, many file formats have large strings of data in file headers that simply do not change. In addition, many file types (e.g. Microsoft PowerPoint files, Microsoft Word files, and the like) routinely have stretches of thousands of fingerprints with degree out of one. This is intuitively correct, as low entropy files generally do not change much from one version to the next. The stretches that do not change are represented by long strands of nodes with degree out of one. This content is then processed into Strand Records that, in turn, may be processed as described above such that the information on-the-wire is greatly reduced. In practice, the DCG method compresses significantly tighter than GZIP and other known techniques.

In summary, by instantiating and maintaining directed cyclic graphs at each side of the communication, on-the-wire data compression is facilitated. In particular, DCGs provide a way to compress data based upon temporal locality (at a respective peer) of ordered chunks within similar prior-seen data.

Cache Synchronization Using Missing Strand Requests

As noted above in the discussion regarding FIG. 6, preferably the deduplication system uses a cache synchronization protocol that involves peers communicating with each other explicitly, e.g., by a peer making certain assumptions about what another peer might have, or otherwise. No matter what cache synchronization protocol exists, the system should account for the fact that something could occur to cause a mismatch in caches between peers. If this occurs, it must be possible to resolve the mismatch and make forward progress. Thus, according to a further feature of this disclosure, the notion of Missing Strand Requests addresses this problem. In particular, whenever a strand is not available for decode on the child, the decoding peer (the child) can make a request back up to the encoding peer (or region of peers) and request the raw data for the noted strand. The processing of data on the decoder side is very fast and thus a missing strand should be detected and a request sent back to the encoder within only a small processing overhead time. This approach ensures that, irrespective of what cache synchronization protocol is being utilized, there is a fallback mechanism to ensure that a transaction can complete. The missing strand support thus handles the possibility of complete cache misses, and it can be used in conjunction with the cache synchronization approach described above (namely, assuming that the decoding peer has a given block of data if the local encoding peer already has it, and assume the decoding peer does not if the local encoding peer does not).

A Missing Strand Request is a mechanism by which a downstream peer can request (from an upstream peer) a particular section of a DCG along with its associated raw data so that the downstream peer has sufficient data to enable it to reproduce and store the graph and blocks on its side. It provides a cache synchronization method that, together with the use of directed cyclic graphs, results in significant performance enhancements.

Whether Strand Records are sent down the wire to the decoding peer (in lieu of the raw data itself) may be implementation-, or context-dependent. When the Missing Strand support (as described above) is in place, there may be an assumption that the decoding peer has a given block of data if the local encoding peer already has it, and that the decoding peer does not if the local encoding peer does not; these assumptions may be appropriate in certain circumstances as, if there is a cache miss, the missing strand support is activated. The conclusion that Strand Records thus should always be used, however, need not necessarily follow. The more two peers communicate with each other, the more often the Strand approach works as items seen first by one are also seen first by the other. When the longevity of peer communication in general is short, however, relying on the above assumptions can lead to a parent believing a child has content just because the parent has it locally. In a scenario where a parent for a hot piece of data talks to a first edge region and synchronizes appropriately, every other edge region that the parent talks to after this will incorrectly be assumed to have the data. Accordingly, the use of Strands will be most appropriate for hot content, as for any given child decode region, that region will only suffer a stall for the first user that needs to download the missing strand. While this user will suffer an additional RTT to fetch the strand, deduplication will still have saved sufficient time on the download (such that the additional RTT might not be noticed) All subsequent users, however, will then benefit from the hot cache.

As a variant, other heuristics may be factored into the decision of when to send just a Strand as opposed to the backing data. For example, if the parent encoding peer has a strand but has not talked to a peer region that is in-line to receive the stream for a given configurable time, the parent can gauge the risk of sending just the strand record based on the RTT. If it is determined that there may be too great a penalty on a cache miss, the raw data may then be sent in lieu of the strand.

Cache synchronization using Missing Strand Request processing as described herein provides a robust and reliable mechanism to keep pairs of disparate dictionaries synchronized on demand and when needed during the deduplication process (i.e., while traffic is flowing through (transiting) the dedupe peers).

The use of directed cyclic graphs and missing strand requests as described herein finds particular utility in providing on-the-wire compression between an edge server and a parent in the context of an overlay network. That particular use scenario is not intended to be limiting, however, as the techniques herein may be used between any two computing entities including, without limitation, client and edge server, forward server and origin, and the like.

Summarizing, the deduplication approach described herein enables removal of redundant data being sent between peers on the network, instead sending much smaller fingerprints. This reduces the overall size of the data on the wire drastically for transactions that have high amounts of duplicate data, thus reducing the amount of time for delivery to the end user. In addition, the reduced data results in lowered operating costs on the network as the amount of information transferred and the bandwidth requires decreases.

A deduplication system as described herein is capable of removing redundant data patterns between peers in order to provide significant compression savings. The architecture approach shown in FIG. 6 may be used, but this is not a requirement, as the dedupe functionality may be implemented in any manner depending on the associated peer implementation. More generally, the dedupe functionality is implemented as co-processes on peer nodes. As noted, for a given request, a dedupe process near an origin replaces well-defined sections of the actual response data with references to it, while the dedupe process near the requester reverses the process, restoring the actual data for the references found. In this way, the amount of common data repeatedly transmitted between the nodes is reduced.

As used herein, a "fingerprint" is a binary compressed representation of a string of data, such as a file. Typically, a fingerprint is a hash with good cryptographic properties, such as SHA-1.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like.

The functionality may be implemented with other application layer protocols besides HTTPS, such as SSL VPN, or any other protocol having similar operating characteristics.

There is no limitation on the type of computing entity that may implement the client-side or server-side of the connection. Any computing entity (system, machine, device, program, process, utility, or the like) may act as the client or the server.

What is claimed is as follows:

1. A non-transitory computer-readable medium having stored thereon instructions that, when executed on a parent data processing node and a child data processing node, carry out the following operations, the parent and child data processing nodes having respective libraries:
   as a stream traverses the parent data processing node, breaking the stream into chunks;
   for a particular chunk of the stream, determining, at the parent data processing node and using a directed cyclic graph (DCG) associated with the parent data processing node, a likelihood that the child data processing node already has the chunk, wherein the directed cyclic graph comprises one or more nodes, wherein a node represents a block of data and has associated therewith a label denoting a fingerprint associated with the block of data, and wherein a given node in the directed cyclic graph has a state selected from a set of states, and wherein a given node in the directed cyclic graph has a state selected from a set of states;
   based on the determination, sending, from the parent data processing node to the child processing node, one of: the chunk, a reference to the chunk, and a compact data structure representing a sequence of chunks as identified in the directed cyclic graph associated with the parent data processing node.

2. The computer-readable medium as described in claim 1, wherein the operations further include:
   as the stream begins to be decoded at the child data processing node, and for at least one reference or compact data structure in the stream, determining whether the reference or the compact data structure, as the case may be, is associated with a chunk stored in the library associated with the child data processing system, wherein the determining step uses a directed cyclic graph (DCG) associated with the child data processing node; and
   when the reference or compact data structure is associated with a chunk stored in the library, incorporating data associated with the chunk back into the stream; and
   when the reference is associated with a chunk or the compact data structure that is missing, performing an on-demand request to the parent data processing node to obtain data corresponding to the chunk or the compact data structure.

3. The computer-readable medium as described in claim 2 wherein the on-demand request is a request for chunks associated with a missing compact data structure.

4. The computer-readable medium as described in claim 1 wherein the set of states include a terminal state, an intermediate state, and an overflow state, wherein a terminal state denotes that the node has a degree out equal to zero, wherein an intermediate state denotes that the node has a degree out equal to one, and wherein an overflow state denotes that the node has a degree out greater than one.

5. The computer-readable medium as described in claim 1 wherein the compact data structure is a strand comprising a sequence of intermediate nodes that are connected together.

6. The computer-readable medium as described in claim 2 wherein the DCG associated with the child data processing node is updated following receipt of the chunks identified in the on-demand request to maintain synchronization between caches associated with the respective parent data and child data processing nodes.

7. A method operative across a parent data processing node and a child data processing node, the parent and child data processing nodes having respective libraries, comprising:
as a stream traverses the parent data processing node, breaking the stream into chunks;
for a particular chunk of the stream, determining, at the parent data processing node and using a directed cyclic graph (DCG) associated with the parent data processing node, a likelihood that the child data processing node already has the chunk, wherein the directed cyclic graph comprises one or more nodes, wherein a node represents a block of data and has associated therewith a label denoting a fingerprint associated with the block of data, and wherein a given node in the directed cyclic graph has a state selected from a set of states, and wherein a given node in the directed cyclic graph has a state selected from a set of states; and
based on the determination, sending, from the parent data processing node to the child processing node, one of: the chunk, a reference to the chunk, and a compact data structure representing a sequence of chunks as identified in the directed cyclic graph associated with the parent data processing node.

8. The method as described in claim 7, further including:
as the stream begins to be decoded at the child data processing node, and for at least one reference or compact data structure in the stream, determining whether the reference or the compact data structure, as the case may be, is associated with a chunk stored in the library associated with the child data processing system, wherein the determining step uses a directed cyclic graph (DCG) associated with the child data processing node; and
when the reference or compact data structure is associated with a chunk stored in the library, incorporating data associated with the chunk back into the stream; and
when the reference is associated with a chunk or the compact data structure that is missing, performing an on-demand request to the parent data processing node to obtain data corresponding to the chunk or the compact data structure.

9. The method as described in claim 7 wherein the on-demand request is a request for chunks associated with a missing compact data structure.

10. The method as described in claim 7 wherein the set of states include a terminal state, an intermediate state, and an overflow state, wherein a terminal state denotes that the node has a degree out equal to zero, wherein an intermediate state denotes that the node has a degree out equal to one, and wherein an overflow state denotes that the node has a degree out greater than one.

11. The method as described in claim 7 wherein the compact data structure is a strand comprising a sequence of intermediate nodes that are connected together.

12. The method as described in claim 8 wherein the DCG associated with the child data processing node is updated following receipt of the chunks identified in the on-demand request to maintain synchronization between caches associated with the respective parent data and child data processing nodes.

13. A non-transitory computer-readable medium having stored thereon instructions that, when executed on a parent data processing node and a child data processing node, carry out the following operations, the parent and child data processing nodes having respective libraries:
as a stream traverses the parent data processing node, breaking the stream into chunks;
for a particular chunk of the stream, determining, at the parent data processing node and using a directed cyclic graph (DCG) associated with the parent data processing node, a likelihood that the child data processing node already has the chunk, wherein the directed cyclic graph comprises one or more nodes, wherein a node represents a block of data and has associated therewith a label denoting a fingerprint associated with the block of data, and wherein a given node in the directed cyclic graph has a state selected from a set of states;
based on the determination, sending, from the parent data processing node to the child processing node, one of: the chunk, a reference to the chunk, and a compact data structure representing a sequence of chunks as identified in the directed cyclic graph associated with the parent data processing node, wherein the compact data structure is a strand comprising a sequence of intermediate nodes that are connected together.

14. The computer-readable medium as described in claim 13 wherein a given node in the directed cyclic graph has a state selected from a set of states.

15. The computer-readable medium as described in claim 14 wherein the set of states include a terminal state, an intermediate state, and an overflow state, wherein a terminal state denotes that the node has a degree out equal to zero, wherein an intermediate state denotes that the node has a degree out equal to one, and wherein an overflow state denotes that the node has a degree out greater than one.

* * * * *